June 5, 1956   E. A. FAIRBANKS   2,748,758
FUEL SYSTEM FOR INTERNAL COMBUSTION ENGINES
Filed Aug. 23, 1954   3 Sheets-Sheet 1

INVENTOR.
EUGENE A. FAIRBANKS
BY
Paul, Moore & Duggu
ATTORNEYS

June 5, 1956     E. A. FAIRBANKS     2,748,758
FUEL SYSTEM FOR INTERNAL COMBUSTION ENGINES
Filed Aug. 23, 1954     3 Sheets-Sheet 2
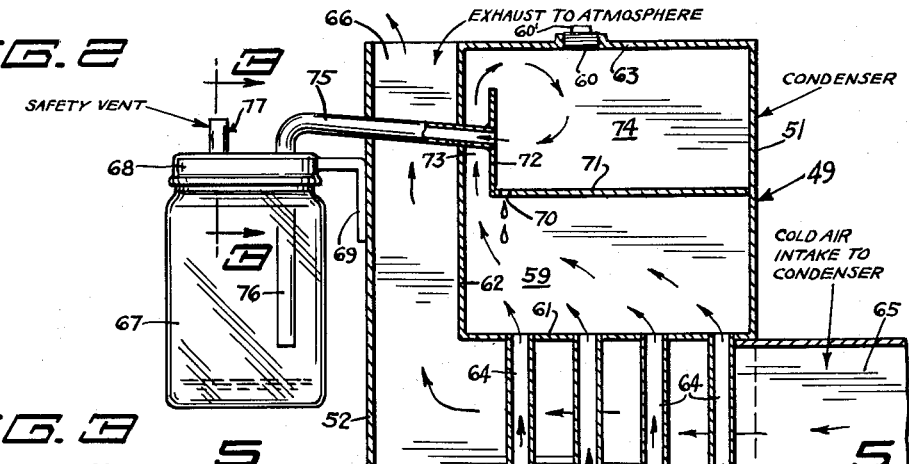
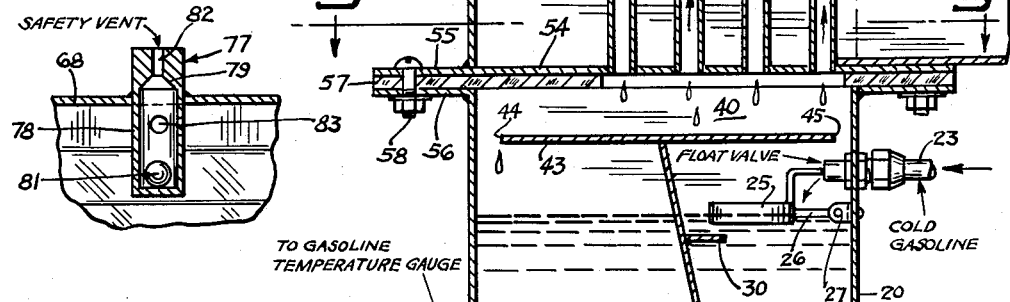
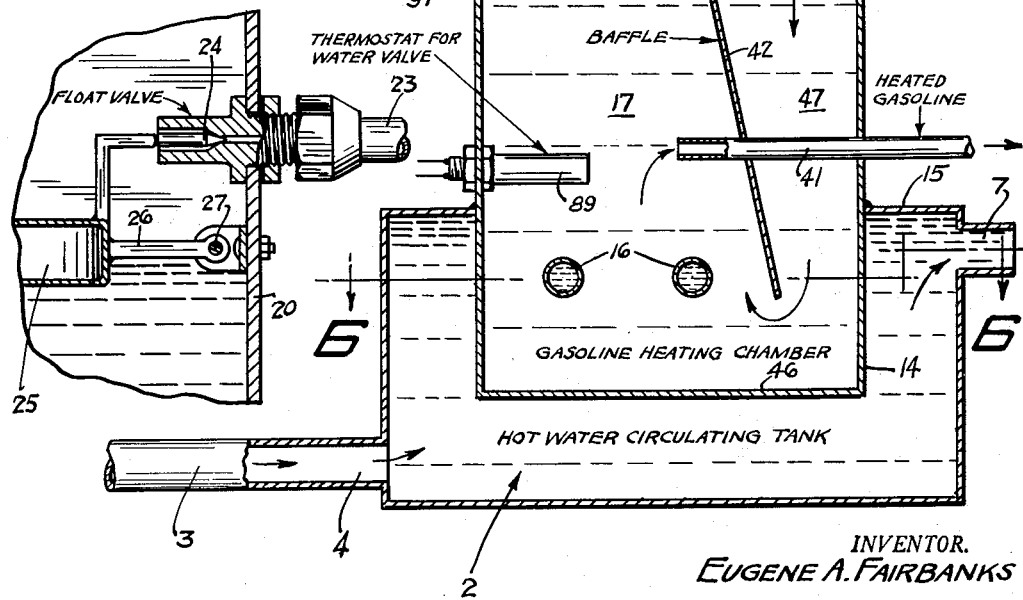
INVENTOR.
EUGENE A. FAIRBANKS
BY
Paul, Moore + Dugger
ATTORNEYS June 5, 1956  E. A. FAIRBANKS  2,748,758
FUEL SYSTEM FOR INTERNAL COMBUSTION ENGINES
Filed Aug. 23, 1954  3 Sheets-Sheet 3
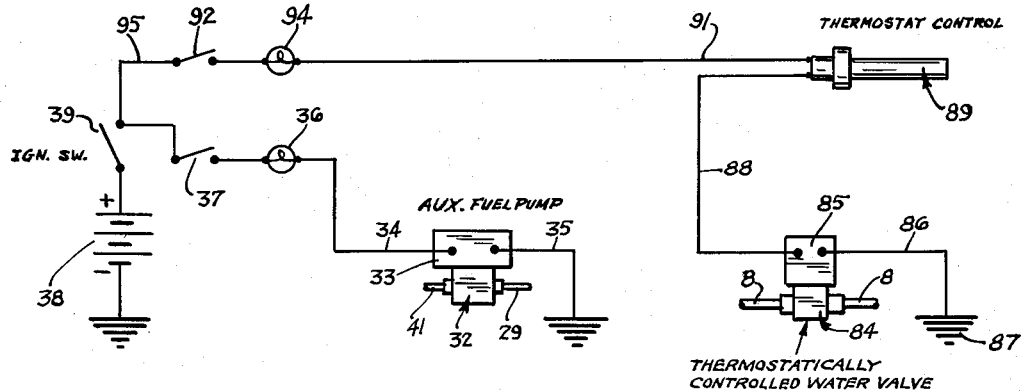
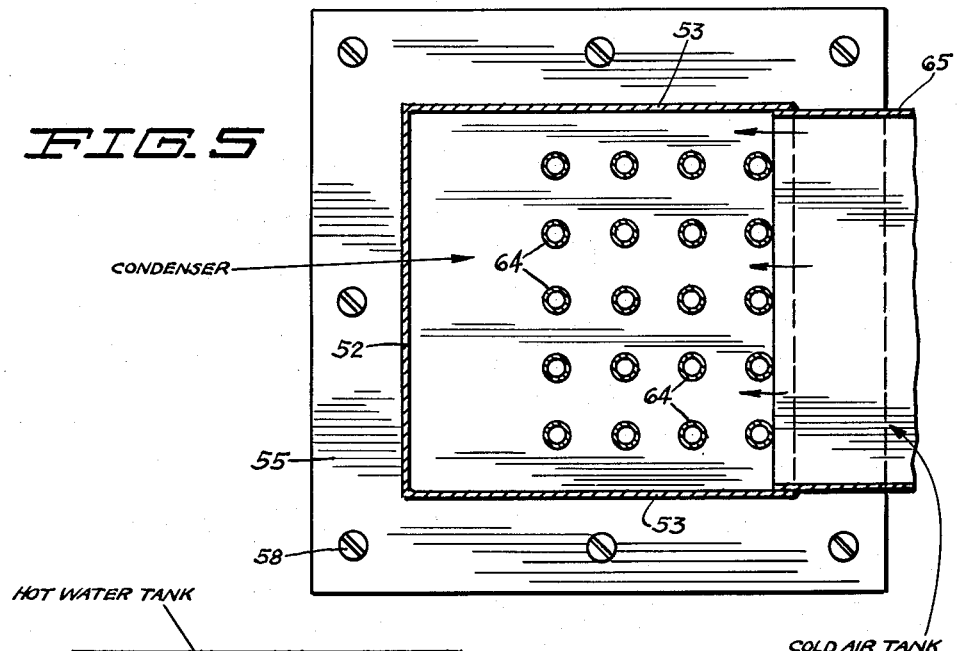
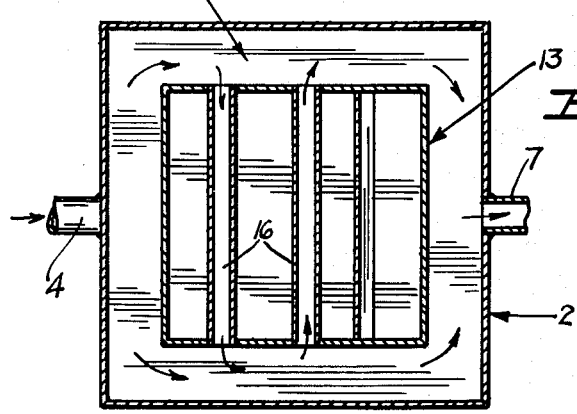
INVENTOR.
EUGENE A. FAIRBANKS
BY
*Paul, Moore + Dugger*
ATTORNEYS United States Patent Office 2,748,758
Patented June 5, 1956

2,748,758

FUEL SYSTEM FOR INTERNAL COMBUSTION ENGINES

Eugene A. Fairbanks, Little Falls, Minn.

Application August 23, 1954, Serial No. 451,407

13 Claims. (Cl. 123—122)

The present invention is directed more particularly to a system for preheating the usual liquid fuel delivered to the combustion chambers of an internal combustion engine to improve the efficiency and performance of the engine, and to render the engine more economical in the use of fuel.

It is well known that internal combustion engines such as are commonly used in automobiles, trucks, buses, and various other types of automotive vehicles, are relatively less efficient, when operated in low temperatures, such as are commonly found in various sections of the country during certain months of the year. Such dropping off in the efficiency and performance of an internal combustion engine during the cold winter months is brought about largely because of the inability of the usual carbureting system of the engine to adequately and thoroughly atomize the cold raw liquid fuel as it is delivered into the combustion chambers of the engine.

Numerous attempts have heretofore been made to provide means for preheating the liquid fuel before delivering it to the engine cylinders, but to the best of my knowledge none of these attempts have proven entirely satisfactory. It is, therefore, an object of the present invention to provide a fuel system for internal combustion engines embodying means for preheating the liquid fuel to a predetermined temperature prior to delivering the fuel to the usual engine carburetor, whereby the liquid fuel may be thoroughly and completely atomized by the carburetor, thereby to provide a highly combustible fuel mixture which may readily be ignited when delivered into the usual combustion chambers of the engine, regardless of freezing atmospheric temperatures.

A further object of the invention is to provide a fuel preheating system for internal combustion engines embodying means for preventing the loss of fuel by evaporation, and which is so constructed that the liquid fuel may be heated to a temperature which will assure thorough and complete atomization of the fuel as it is delivered into the combustion chambers of the engine, whereby the efficiency and performance of the engine is greatly improved with a resultant saving in fuel.

A further and more specific object of the invention is to provide a fuel preheating system of the class described comprising a tank having fluid circulating connections with the usual cooling system of the engine, whereby a portion of the engine cooling fluid may be circulated through said tank, and a housing having a portion thereof submerged in the fluid in said tank and providing a heating chamber through which all or a portion of the liquid fuel flowing to the engine carburetor may pass to be preheated, as an aid to combustion.

A further object of the invention is to provide a fuel heating system for internal combustion engines comprising a heating chamber into which the liquid fuel or gasoline may be delivered from the usual gasoline storage tank of the vehicle for the purpose of preheating the liquid fuel before it is delivered to the usual combustion chambers of the vehicle engine, and a condenser being in communication with the heating chamber for receiving the vapors rising from the heated liquid fuel, said vapors being condensed in said condenser and returning to the heating chamber as liquid fuel, whereby the liquid fuel may readily be heated to the desired temperature to provide thorough and complete atomization thereof without loss by evaporation, and whereby the efficiency and performance of the engine is greatly improved when operating the engine during cold weather, and with a marked saving in the amount of liquid fuel used per mile of travel.

Other objects of the invention reside in the unique construction of the hot water circulating tank and the gasoline heating chamber in the upper portion of which the condensing means is mounted, and whereby all of said parts may be combined in a single composite unit to facilitate construction and installation adjacent to an automobile engine; in the means provided for automatically controlling the temperature of the liquid fuel in the fuel preheating chamber, whereby the liquid fuel or gasoline in said chamber may be maintained at a predetermined temperature, regardless of atmospheric temperatures; in the means provided for rendering the liquid fuel heating means inoperative, when desired, as when operating the vehicle in extremely warm atmospheric temperatures; in the provision of an auxiliary fuel pump for pumping the heated liquid fuel from the fuel heating tank to the engine carburetor; and in the means provided for controlling the temperature of the water in the water tank to prevent overheating of the liquid fuel or gasoline in the fuel heating tank.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a side elevational view of an internal combustion engine schematically illustrating the invention applied thereto;

Figure 2 is an enlarged vertical sectional view of the composite structure showing the relation between the hot water circulating tank and the gasoline heating chamber, and the condensing means provided in the upper portion of the housing constituting the gasoline heating chamber for condensing the vapors rising from the heated gasoline and returning such vapors to the liquid fuel heating chamber in the form of a liquid;

Figure 3 is an enlarged detail sectional view on the line 3—3 of Figure 2, showing the safety vent provided for venting the apparatus to the atmosphere;

Figure 4 is an enlarged detail sectional view illustrating the float-operated valve for controlling the delivery of cold liquid fuel or gasoline into the heating chamber from the usual gasoline storage tank of the vehicle;

Figure 5 is a horizontal sectional view on the line 5—5 of Figure 2, showing the arrangement of the vapor circulating tubes in the cold air intake of the condenser;

Figure 6 is a horizontal sectional view on the line 6—6 of Figure 2, on a slightly reduced scale, showing the hot water circulating tubes provided in the lower portion of the gasoline heating chamber; and Figure 7 is a wiring diagram showing the electrical connections between the various control elements of the system.

*Composite unit and connections*

Figure 1:
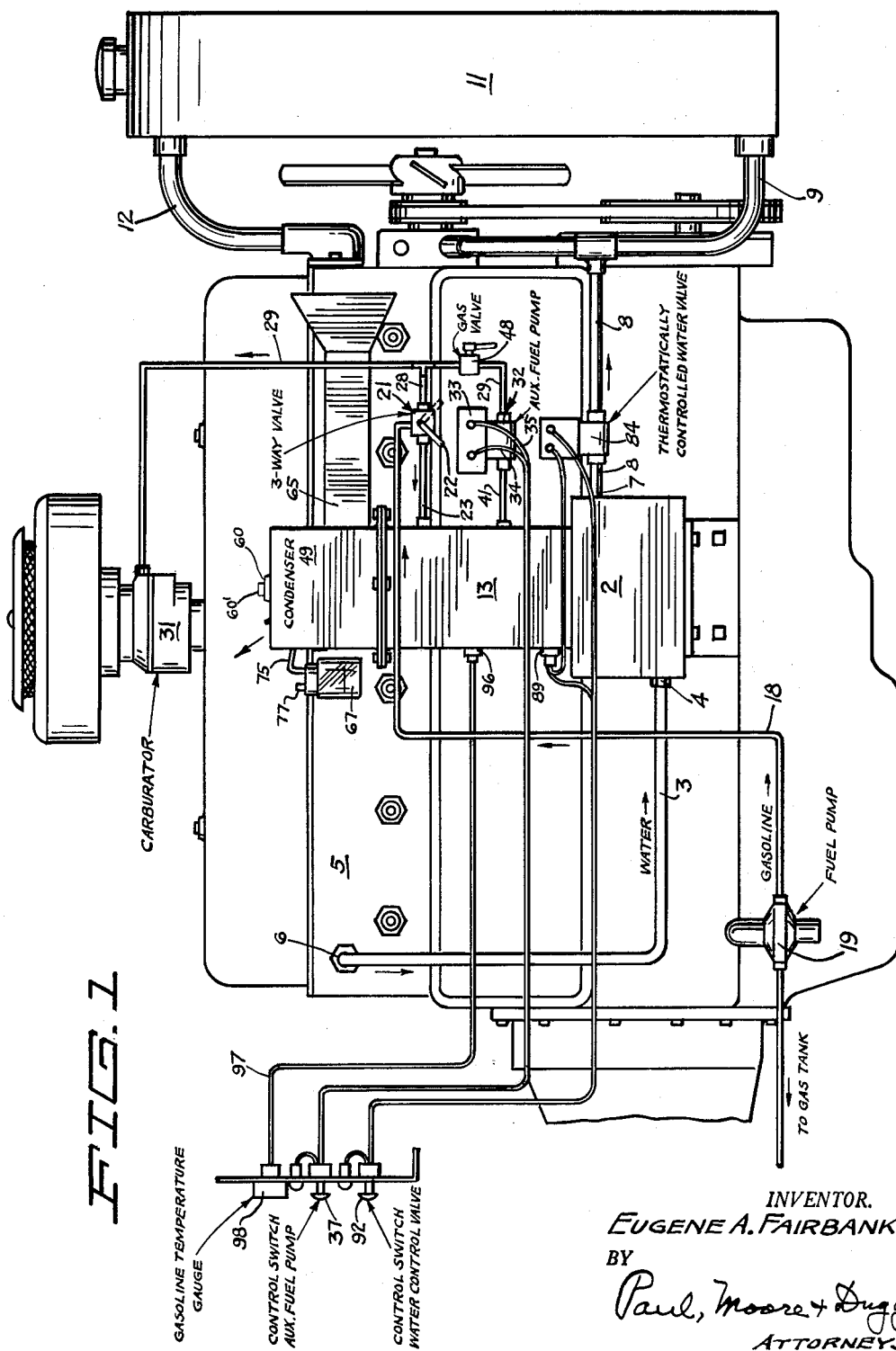

The novel fuel heating system herein disclosed is shown comprising a hot water circulating tank 2 having a conduit 3 connecting the intake 4 thereof to the usual water circulating jacket of the vehicle engine 5, as indicated at 6 in Figure 1. The discharge 7 of the hot water tank 2 has a conduit 8 connecting it to the usual water circulating conduit 9 of the engine radiator 11 which connects the lower end of the radiator 11 to the usual water circulating pump of the engine. The upper portion of the radiator 11 is in communication with the water circulating jacket of the engine by the usual pipe or conduit 12, shown in Figure 1.

*Fuel heating means*

An important feature of the present invention resides in the means provided for preheating the liquid fuel or gasoline before it is delivered to the engine carburetor. Such means is shown comprising a housing 13 having its lower portion 14 extending downwardly through an opening in the top wall 15 of the hot water circulating tank 2 in leaktight relation, whereby the lower portion 14 of the housing 13 is subjected to the temperature of the hot water circulating through the tank 2 during operation of the vehicle engine. Transversely disposed water circulating ducts 16 are provided in the lower portion of the housing 13 to permit hot water to flow through the lower portion of the gasoline heating chamber, designated by the numeral 17, to facilitate and expedite the heating of the liquid fuel in the lower portion of the gasoline heating chamber 17.

Gasoline at normal or atmospheric temperature is delivered to the upper portion of the heating chamber 17 from a tube or conduit 18, having one end connected to the usual fuel pump 19 of the vehicle and its opposite end to a three-way control valve 21 having an operating handle 22 to facilitate operating the valve to control the directional flow of the liquid fuel from the conduit 18.

A small tube 23 leads from one side of control valve 21 to a float-actuated needle valve 24, shown mounted in the upright wall 20 of the housing 13. The needle valve 24 is operated by a float 25 having an arm 26 pivoted at 27 to a bracket secured to the wall 20 of the housing 13. The float 25 is adapted to float on the surface of the liquid fuel or gasoline in the heating chamber 17, and functions to automatically shut off the delivery of cold liquid fuel into the heating chamber when the surface of the liquid fuel reaches the level shown in Figure 2, as will be understood. A conduit 28 leads from the opposite side of the control valve 21 to an upright tube 29, the upper end of which is shown connected to the usual carburetor 31 of the vehicle engine. A fixed stop 30 is provided for limiting downward movement of the float 25, when the level of the liquid fuel drops below that indicated in Figure 2.

*Auxiliary fuel pump*

The lower end of conduit 29 is connected to an auxiliary fuel pump 32, shown arranged to be electrically operated by an electric operating device, generally designated by the numeral 33, of conventional construction. Wires 34 and 35 are shown connected to the electric device 33 for supplying electric current thereto. Wire 34 may be provided with a warning light 36, and has a control switch or button 37. Warning light 36 and switch 37 are preferably mounted on the usual instrument panel of the vehicle, whereby the operator may readily and conveniently control the operation of the auxiliary pump from the driver's seat, as will be understood. Wire 35 of the auxiliary pump 32 is shown grounded, thereby to complete a circuit to the usual battery 38 of the vehicle, as indicated in Figure 7. The usual ignition switch 39 is also indicated in Figure 7, and is so arranged with respect to the switch 37 that when the ignition switch is open, the auxiliary fuel pump 32 cannot be operated.

The opposite side of the auxiliary fuel pump 32 had one end of a conduit 41 connected thereto, the opposite end of which passes through aligned openings in the wall 20 of housing 13, and a baffle plate 42, and into the heating chamber 17, with its inner end terminating in the central portion of the heating chamber. Baffle plate 42 has its opposed side edges disposed in fixed relation to the corresponding walls of housing 13, and is preferably arranged at an angle, as shown. A horizontal plate 43 is secured to the upper end of the baffle plate 42 and has its edges disposed in spaced relation to the corresponding walls of the housing 13, as indicated at 44 and 45, thereby to provide vapor circulating passages between the heating chamber 17 and the expansion chamber 40 provided above the plate 43. The baffle plate 42 and top plate 43 cooperate to prevent splashing and surging of the liquid fuel or gasoline in the heating chamber 17 when the vehicle is in motion.

The lower end of the baffle plate 42 is spaced from the bottom wall 46 of the heating chamber 17 and also from the wall 20 thereof to provide a fluid circulating passage therebeneath, as will be understood. In other words, the baffle plate 42 divides the interior of the housing 13 into the main heating chamber 17, and an auxiliary chamber 47. The cold liquid fuel or gasoline enters chamber 47 from the float valve 24 and flows downwardly through said chamber around the bottom end of the baffle plate 42, and into the bottom of the heating chamber 17, as indicated, where it is quickly heated to the desired temperature by the circulation of hot water through tank 2. A manually operable shut-off valve 48 is provided in the conduit 29 between the conduit 28 and the auxiliary fuel pump 32 for cutting off the circulation of liquid fuel through the lower end of the conduit 29 under certain conditions.

*Condensing means*

The condensing means is best illustrated in Figure 2, and comprises a housing, generally designated by the numeral 49, having front and rear walls 51 and 52, and side walls 53 secured to a bottom wall 54. The bottom wall 54 preferably has its marginal edges extending outwardly beyond the upright walls of the housing 49 to provide an annular flange 55 adapted to seat upon a similar flange 56 provided on the upper end of the housing 13 of the gasoline heating chamber 17. A suitable sealing element or gasket 57 is shown interposed between the flanges 55 and 56. The housing 49 is secured to the housing 13 in leaktight relation by suitable bolts 58, and preferably has a filler opening 60 in its top wall 63. A plug 60' normally closes said opening.

Within the condenser housing 49 there is provided a relatively smaller cooling chamber 59 formed by a plurality of walls 61, 62, 63, and the front wall 51 of housing 49. Vapor circulating tubes 64 have their upper ends communicating with the interior of chamber 59, and their lower ends are fixed to the bottom wall 54 of the condenser housing 49 and are in communication with the expansion chamber 40 located between plate 43 and the bottom wall 54 of housing 49, as clearly illustrated in Figure 2.

A cold air duct 65 has one end in communication with the lower portion of the interior of housing 49, and its opposite end may be extended forwardly and positioned to receive fresh cold air at atmospheric temperature, when the vehicle is in operation. The cold air thus is delivered into the lower portion of housing 49 around and between the vapor circulating tubes 64 from the cold air duct 65, flows upwardly through an exhaust passage 66 to the atmosphere. The expanded fuel vapor flowing upwardly through the air circulating tubes 64 is thus quickly cooled and condensed into liquid fuel which is returned to the heating chamber 17 by gravity, as indicated in Figure 2. Any fuel vapor entering the cooling chamber 59 from the tubes 64 is quickly condensed therein.

Additional means is provided for preventing the escape of gasoline vapors to the atmosphere, and is shown comprising an auxiliary reservoir 67, which preferably is in the form of a glass jar having a screw top 68 shown secured to the rear wall 52 of the housing 49 by a suitable bracket 69.

Mounted within the chamber 59 is an L-shaped wall member 71, having its horizontal portion positioned substantially midway between the bottom and top walls 61 and 63, respectively, of chamber 59. The upright wall portion 72 of the L-shaped wall 71 is spaced inwardly from the wall 62 of chamber 59 to provide an air circulating passage 73 through which any vapor entering chamber 59 may circulate upwardly into an upper chamber 74 provided above the horizontal wall 71, as shown in Figure 2. A drain aperture 70 is provided in wall 71 to permit drainage of condensate from the cooling chamber 74.

A tube 75 has one end in communication with the chamber 74 and extends outwardly through aligned apertures in the walls 62 and 52, and has its outer end portion bent downwardly and inserted through an opening in the closure cap 68, and into the auxiliary chamber 67, with its bottom end spaced upwardly from the bottom wall of reservoir 67, as indicated. The upright portion 76 of tube 75 is suitably secured to the closure cap 68 in leak-tight relation thereto. Tube 75 may be constructed of any suitable material applicable for the purpose.

Safety vent

A safety vent 77 is provided in the closure cap 68 and comprises a tubular element 78 which depends from the closure cap 68 into the interior of the auxiliary reservoir 67. A valve seat 79 is provided in the upper end of the tubular element 78 adapted to be engaged by a ball check valve 81 which normally is supported in the bottom of the tubular element 78, as shown in Figure 3. The element 78 has a vent opening 82 at its upper end, and an opening 83 in the wall thereof within the reservoir 67.

The auxiliary reservoir 67 serves to condense and restore to liquid fuel and fuel vapors which may escape from chambers 59 and 74 through tube 75. Thus, the loss of liquid fuel or gasoline by evaporation, as a result of heating the gasoline before delivering it to the combustion chambers of the engine, is substantially eliminated. Under ordinary driving conditions, regardless of atmospheric temperatures, all gasoline vapor rising from the heating chamber 17 into the condenser 49 is condensed or completely liquefied, whereby it may flow by gravity back into the heating chamber 17, as indicated in Figure 2.

Thermostatically controlled water valve

Means is provided for automatically controlling the circulation of hot water from the engine water jacket through the hot water circulating tank 2, and is shown comprising a thermostatically controlled valve 84 interposed in the conduit 8 which conducts the heated water from tank 2 to the lower radiator connection 9, as illustrated in Figure 1.

The water control valve 84 is electrically operated by an electric device 85, diagrammatically illustrated in Figure 7. The valve 84 and its operating device 85 are of well-known construction, and it is therefore believed unnecessary to illustrate the same in detail. Suffice it to say that the electrical device 85 has a wire 86 connecting it to a ground 87, and a wire 88 connecting it to one side of a thermostat, generally designated by the numeral 89. The other side of the thermostat 89 has a wire 91 connecting it to a control switch or push button 92, shown mounted on the instrument panel of the vehicle, as indicated in Figure 1.

A warning light 94 is shown electrically connected in the wire 91 to indicate to the driver when the switch 92 is closed. The warning light 36 of the auxiliary fuel pump 32 similarly functions to warn the driver when the switch 37 is on. A wire 95 connects switch 92 to one side of the ignition switch 39, whereby the thermostatically controlled water valve 84 cannot be opened until the ignition switch 39 is closed.

Operation

When an internal combustion engine is initially to be started after being equipped with a fuel heating system such as herein disclosed, it may be necessary to prime the heating chamber 17 with liquid fuel to bring the fuel level in chamber 17 up to or over the intake end of suction tube 41, as will be understood. This may readily be accomplished by removing the plug 60′ from the filler opening 60 in the top wall 63 of chamber 74, and introducing liquid fuel into chamber 74. The liquid fuel thus introduced into chamber 74 to prime the heating system will flow through drain opening 70 into chamber 59, thence through the upright vapor circulating ducts 64 into expansion chamber 40, and from chamber 40 around the edges of the horizontal plate 43 and into the bottom of the heating chamber 17. After the engine has been initially started following priming of the heating chamber, said chamber will require no further priming under normal operating conditions, as it is thereafter maintained substantially full by the float-operated valve 24, as indicated in Figure 2.

Before manipulating the starter switch to initially start the engine following the priming operation, the operator conditions the auxiliary fuel pump 32 and water control valve 84 for operation by manipulation of switches 37 and 92, respectively, it being understood that the ignition switch 39 was previously closed to start the engine. Thus, after the engine initially "kicks off" by actuating the starter switch following the priming operation, all the various elements of the fuel heating and feeding system, including the auxiliary pump 32, water control valve 84, thermostat 89, gasoline temperature gauge 96—98, and the warning lights 36 and 92 are rendered operable to carry out their respective functions and to maintain a continuous supply of heated fuel for the engine. Valve 84 is normally retained in open position by the solenoid or device 85.

As the engine continues to operate, the liquid fuel or gasoline in the heating chamber 17 eventually becomes heated to its maximum or most efficient operating temperature, determined by the thermostatic element 89. When this occurs, element 89 automatically effects closing of the water valve 84 to thereby prevent further heating of the water or cooling medium in tank 2. When the liquid fuel or gasoline is heated to its most efficient operating temperature, approximately 150° F. to 160° Fahrenheit, it readily expands and may be thoroughly and completely atomized by the engine carburetor, thereby to provide a highly combustible fuel mixture which, when directed into the combustion chambers of the engine, is readily ignited, and renders the engine highly efficient and economical in operation.

In fuel heating systems as hereinbefore constructed, much of the fuel has been lost as a result of evaporation. The novel fuel heating system herein disclosed is so constructed that the rising vapor from the heated fuel is quickly cooled and condensed to liquid in the condenser within the housing 49, whereupon the condensate is returned to the heating chamber 17 by gravity without loss.

Should the temperature of the liquid fuel in the heating chamber 17 rise above the desired operating temperature, then thermostat 89 breaks the control circuit for valve 84, whereupon said valve automatically closes to temporarily interrupt the flow of cooling medium or water from the engine cooling jacket into tank 2. The thermostat 89 thus maintains the liquid fuel in chamber 17 at the desired operating temperature under all normal operating conditions. The temperature of the fuel or gasoline in chamber 17 may readily be noted by the operator of the vehicle at all times on the gauge 98.

Such heating of the volatile liquid fuel or gasoline causes it to vaporize and expand into the expansion chamber 40, from whence the hot vapor passes upwardly through the condensing tubes 64 and into the cooling chamber 59. As the hot fuel vapor passes upwardly through tubes 64, it is quickly chilled or cooled and condensed into liquid fuel, and the resultant condensate is returned by gravity to chamber 17, as indicated in Figure 2. Any fuel vapor entering the cooling chamber 59 from the ducts 64 is normally condensed therein. If not, it may pass upwardly through air passage 73 into the upper chamber 74, wherein such vapors are condensed into liquid which drains through aperture 70 back into chamber 59, and thence through tubes 64 to heating chamber 17.

Under all normal operating conditions, even in extremely low atmospheric temperatures, all the expanded fuel vapor is condensed into liquid fuel and returned to the heating chamber. In some instances, some of the fuel vapors may pass from chamber 74 through tube 75 into the auxiliary reservoir 67, wherein it is converted into liquid fuel because of the discharge end of tube 75 usually being positioned beneath the level of the liquid in reservoir 67. The discharge end of tube 75 is preferably positioned relatively close to the bottom wall of reservoir 67.

The novel fuel heating system herein disclosed has been found extremely efficient in actual operation. It serves its maximum usefulness when operated in cold climates where atmospheric temperatures may be so low that it is impossible to operate a conventional internal engine with any degree of efficiency. Actual experience has shown that an engine equipped with the novel fuel heating system herein disclosed may be operated in frigid temperatures as efficiently and economically as if the engine were being operated in extremely hot summer temperatures. In other words, by heating the liquid fuel to a temperature of approximately 140° to 160° Fahrenheit, the liquid fuel expands to an extremely volatile and highly combustible vapor, which, when delivered to the engine carburetor, may be thoroughly and completely atomized, as hereinbefore stated, thereby to provide a highly explosive mixture which greatly improves the efficiency and performance of the engine and increases its power and effects a marked increase in fuel economy.

To assure maximum efficiency and top performance of the engine in frigid temperatures, the gasoline feed tubes 28 and 29 are preferably covered with a suitable insulating material to prevent chilling of the heated liquid fuel vapors flowing therethrough to the carburetor. Such insulation may be dispensed with, when operating the engine in warm atmospheric temperatures. The invention has proven highly effective in widely varying atmospheric temperatures, whereby an engine so equipped may be operated at maximum efficiency the year around, although it attains its greatest utility and is most effective, when the engine is operated in extremely low or frigid atmospheric temperatures. It positively prevents interruption in the flow of liquid fuel through the usual fuel feed lines of the engine, caused by the fuel "freezing" therein, or from vaporlock, because by so preheating and partially vaporizing the liquid fuel before delivering it to the engine cylinder, the fuel is rendered highly immune from such contingencies, as will readily be understood.

In the application drawings, the composite unit is shown adapted for vertical mounting. It is to be understood, however, that the apparatus may be adapted for horizontal mounting by slightly varying or changing the positions of the various elements embodied in the construction thereof. Its construction is also such that it may readily be assembled as a composite unit to facilitate installation in the vehicle, as will be understood by reference to Figures 1 and 2, and whereby the installation costs may be reduced to a minimum.

The system is completely selective, in that by interrupting operation of the auxiliary fuel pump and manipulating the three-way valve 21 to direct the flow of liquid fuel from tube 18 directly to tube 29, the heating system is completely by-passed so that the engine may be operated with the liquid fuel at atmospheric temperature, which may be desirable when operating the engine in extremely warm temperatures. Under such conditions, the cut-off valve 48 may be shut off.

The foregoing detailed description has been given for clearness of understanding only, and no unnecessary limitations should be understood therefrom, but the appended claims should be construed as broadly as permissible in view of the prior art.

I claim as my invention:

1. The combination with an internal combustion engine including a carburetor and a fuel supply tube for conducting liquid fuel to the carburetor, of means interposed in said tube for preheating and expanding the liquid fuel flowing therethrough to the carburetor, means comprising a closed fuel heating chamber which is in communication with the fuel supply tube, means for heating the liquid fuel delivered into said chamber, means for conducting heated fuel from the heating chamber to the engine carburetor, condenser means in communication with said chamber for condensing the vapors rising from the heated fuel, a cooling chamber connected to the heating chamber by a plurality of laterally spaced vapor circulating tubes, and a fresh air duct for directing a flow of cold air against the walls of said vapor circulating condenser tubes, thereby to quickly condense the vapors passing therethrough.

2. The combination with an internal combustion engine including a fluid circulating system for a cooling medium, a carburetor, and a fuel supply pipe for conducting liquid fuel to the carburetor, means in communication with said tube for preheating and expanding the liquid fuel flowing therethrough to the carburetor, said means comprising a closed fuel heating chamber defined by a plurality of walls, a closed tank through which a portion of the cooling medium in the engine cooling system is circulated, portions of the walls defining said heating chamber being disposed within said tank, whereby said walls are heated and thus transmit heat to the liquid fuel within the heating chamber, temperature responsive means for controlling the temperature of the liquid fuel in the heating chamber, and condenser means in communication with said chamber for receiving and cooling the vapors rising from the heated fuel and thereby restoring said vapors to liquid fuel.

3. A liquid fuel heating system according to claim 2, wherein a thermostatically controlled valve is interposed in the conduit connecting the water circulating tank to the engine radiator, thereby to automatically control circulation through said tank.

4. A fuel heating system according to claim 2, wherein means is provided for preventing circulation of the liquid fuel through the heating chamber, when the engine is operating in relatively high atmospheric temperatures.

5. A fuel heating system according to claim 2, wherein means is provided within the heating chamber for directing the incoming liquid fuel into direct contact with the heated wall surfaces of said chamber, thereby to expedite heating of the liquid fuel.

6. The combination with an internal combustion engine including a fluid circulating system for a cooling medium, a carburetor, and a fuel supply tube for conducting liquid fuel to the carburetor, of means for preheating and expanding the liquid fuel flowing through said tube to the carburetor, said means comprising a housing having a fuel heating means therein, and valved means in communication with said tube for selectively directing the liquid fuel therefrom to the fuel heating means in said housing for preheating, or directly to the engine carburetor, depending upon atmospheric temperatures.

7. A fuel heating system according to claim 6, wherein said valved means is in the form of a three-way valve having fluid-circulating connections with said fuel feed tube, the fuel heating means, and the engine carburetor.

8. A fuel heating system according to claim 6, wherein a baffle plate divides the interior of the housing into two chambers, one for receiving the cold liquid fuel from the fuel supply tube, and a heating chamber having its lower end in communication with the lower end of said receiving chamber, and said heating chamber having one end of a fuel feed tube connected thereto for conducting the heated fuel to the engine carburetor.

9. In a fuel heating system of the class described, a fluid circulating tank having means for connecting it to the usual water circulating jacket of an engine cooling system whereby a portion of the heated cooling medium may be circulated therethrough, a housing having wall portions exposed to the fluid circulating through said tank for heating the interior of said housing, a second housing secured to the upper end of said first housing and having means therein providing a closed cooling chamber, a plurality of vapor circulating tubes connecting the upper end of the first chamber with the cooling chamber in said second housing, means in said first housing for dividing the interior thereof into a cold liquid fuel receiving chamber and a heating chamber having their lower ends in communication with one another, means for delivering cold liquid fuel into the upper portion of said receiving chamber for delivery into the lower portion of said heating chamber, a fuel feed pipe in communication with the heating for conducting heated liquid fuel therefrom to the usual carburetor of the engine, said heating chamber preheating the liquid fuel delivered thereto from the receiving chamber to thereby thoroughly heat and partially vaporize the liquid fuel delivered to the engine.

10. In a fuel heating system according to claim 9, wherein the cooling chamber provided in said second housing has an L-shaped wall therein dividing the interior thereof into dual chambers having a passage therebetween through which fuel vapors entering said cooling chamber from the vapor circulating tubes is condensed and returned to the heating chambers as condensate.

11. A fuel heating system according to claim 10, wherein an auxiliary reservoir is detachably secured to said second housing and is in communication with the interior of the chamber provided therein, said auxiliary reservoir having a safety vent in the upper portion thereof.

12. A fuel heating system according to claim 11, wherein the auxiliary reservoir is in the form of a cylindrical member having its upper end threaded to receive a screw-type closure cap which is fixed to a wall of the second housing, said auxiliary reservoir being readily detachable from said closure cap.

13. A fuel heating system according to claim 9, wherein means is provided for directing a flow of cold air around and between said vapor circulating tubes, thereby to condense the vapors passing upwardly therethrough.

References Cited in the file of this patent

UNITED STATES PATENTS

| | | |
|---|---|---|
| 1,110,807 | Lucke et al. | Sept. 15, 1914 |
| 1,256,186 | Ver Planck | Feb. 12, 1918 |
| 1,559,214 | Woolson | Oct. 27, 1925 |
| 2,231,525 | Breitling | Feb. 11, 1941 |